3,337,372
PROCESS FOR IMPROVING PROPERTIES OF ZIRCONIUM METAL

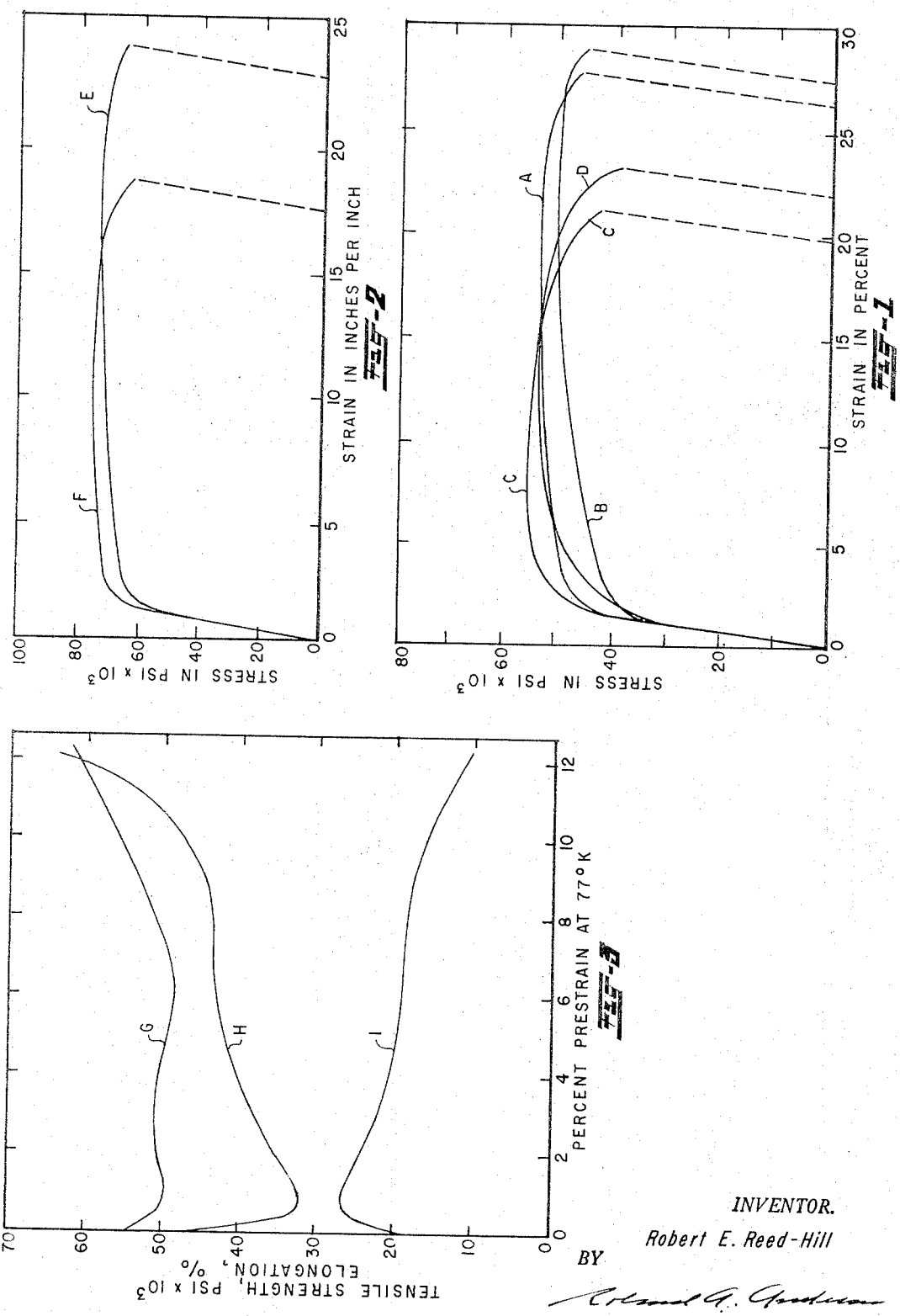

Robert E. Reed-Hill, Gainesville, Fla., assignor to the United States of America as represented by the United States Atomic Energy Commission
Filed Nov. 6, 1963, Ser. No. 321,983
8 Claims. (Cl. 148—11.5)

The invention described herein was made in the course of or under Contract AT(38-1)-252 with the U.S. Atomic Energy Commission.

The present invention relates to a method of improving the physical properties of a metal and more particularly to a process of increasing the ductility of zirconium and zirconium alloys.

In the present day rapid advancement of technological developments, there is an increasingly greater need for metals having improved physical properties. In the field of nuclear energy, and particularly in nuclear reactors, metals used as structural components of reactor cores, fuel elements, and associated apparatus such as instrumentation, are exposed to operating environments of high temperature and nuclear radiation. Zirconium metal and its alloys have proven to be extremely useful in nuclear reactor environments because of their well known physical and chemical characteristics of low neutron absorption, relatively low neutron moderation, and high corrosion resistance in reactor environments.

It is important that nuclear reactor materials have high ductility to preclude or reduce the probability of fracture when stressed beyond their elastic limits.

It is therefore an object of this invention to provide a process for improving the physical properties of metals.

It is a further object of this invention to provide a process for improving the ductility of zirconium and its alloys.

It has been found that by inducing a prestrain in zirconium metal at relatively low temperatures, the general ductility of the metal has become markedly improved. This is believed to be attributable to twin formation in the crystallographic structure of the metals, viz, grains not favorably oriented for slip. It is known, for example, from "Basic Engineering Metallurgy," by C. A. Keyser, Prentice-Hall, Inc., New York, fourth printing, 1954, pages 30–32, that metal failure by deformation is due to the processes of slip and twinning. The process known as slip, as described in the reference, involves a relative movement of layers of ions in a crystal. The process known as twinning involves the reorientation of a section of the crystal from the parent orientation to a new orientation in which a twin may be thought of as being found by a 180° rotation of a section of a crystal about the twinning axis, although no actual rotation is involved, such that the twin is the mirror image of the parent.

In accordance with the broader aspects of the invention a flat plate of zirconium metal is reduced in temperature to about 77° K. by immersing it in liquid nitrogen. The plate is then removed from the liquid nitrogen and deformed (or deformed in the liquid nitrogen), such as by tensile straining or cold rolling, at a predetermined reduction rate to the final thickness desired. Where cold rolling is employed, the plate is recooled before each pass through the rolling mill to assure maintenance of the aforesaid temperature. The rolling direction is controlled so that in those grains in which the basal plane is not parallel to the rolling plane the basal plane of the grains tends to lie perpendicular to the direction of rolling. After rolling, the plate is returned to room temperature and may then be fabricated into a structural component for a particular application. Tensile tests performed on specimens cut from metal stock produced by this method show that the ductility of the metal has markedly improved. This is believed to be due to formation of twins in grains not favorably oriented for slip by other known methods of production. In the case where the grains are favorably oriented for slip, i.e., where the grains are oriented in a direction parallel to the direction of rolling (during initial fabrication of the sheet material), macroscopic plastic flow begins at a much lower stress than in the case where an appreciable fraction of the grains are unfavorably oriented for slip, such as in a direction transverse to the direction of rolling, for example.

The deformation caused by cold-rolling at this extremely low temperature induces a prestrain in the metal which is believed to be related to and aid in the improved ductility. In practice, the metal-forming operation is controlled so that a prestrain of the proper type and predetermined amount is placed in the metal at approximately 77° K. This strain is such as to heavily nucleate twins in those grains of the metal's texture whose basal planes are so oriented as to be perpendicular to the directions along which it might be expected that the finished material would undergo tensile strain.

Novel aspects and important features of the invention will become more apparent by reading the examples given below taken in conjunction with the drawings wherein FIG. 1 shows stress-strain curves for zirconium specimens, FIG. 2 shows stress-strain curves for Zircaloy-2 specimens, and FIG. 3 shows tensile properties of zirconium specimens as functions of varying percentages of prestrain at 77° K.

Example I

Pure zirconium specimens were prepared from 0.5-inch thick, 5.5-inch wide sheet rolled from a cast ingot of vacuum arc melted sponge zirconium. The zirconium was rolled from the ingot into a 2-inch slab at 1800° F. It was found that the basal planes of the grains were parallel to the rolling direction and uniformly distributed in space around the rolling direction. Tensile test specimens were machined from this plate in such a manner that the longitudinal axes of the specimens were parallel to the transverse plate direction. Normal techniques, involving both mechanical and acid machining, were employed to produce the final ⅛ inch diameter by 1.25-inch long cylindrical gage sections.

These specimens were given prestrains at 77° K. by deforming them in tension in liquid nitrogen.

Room temperature tensile tests were performed on these specimens as well as on non-prestrained zirconium control specimens. The results of these tests are illustrated in FIG. 1 which shows the effect of prestrain at 77° K. on the room temperature stress-strain curves for zirconium. Curve A represents a transverse specimen prestrained 8.2 percent at 77° K. Curve B represents a transverse specimen prestrained 4 percent at 77° K. Curve C represents a transverse specimen nonprestrained and Curve D represents a longitudinal specimen non-prestrained. These results show that the 77° K. prestrained specimens both exhibit an elongation about 25 percent greater than that of the non-prestrained specimens.

Example II

Zircaloy-2 specimens were prepared by rolling a 12-inch diameter ingot to a 4-inch thick slab at 1850° F., which is turned and rolled to ⅞-inch thickness at 1800° F. with the ingot axis in the transverse direction, cooled to 1450° F. and rolled to 25/32 inch thickness. The slab was then annealed for 45 minutes at 1850° F. and water spray quenched, after which it was rolled to a 0.5-inch thickness at 100° F., annealed 30 minutes at 1425° F. and air cooled. The preparation of this material for deforming to prestrain at 77° K., the deforming steps and the production of the tensile test specimens were the same as in Example I. The results are illustrated in FIG. 2 which shows the effect of prestrain at 77° K. on the room temperature stress-strain diagram of transverse Zircaloy-2 specimens. Curve E represents a transverse specimen prestrained 4.2 percent at 77° K., then deformed at 300° K. Curve F represents a transverse specimen deformed directly to fracture at 300° K. Similarly to Example I, the prestrained specimen showed an elongation of about 25 percent more than the non-prestrained specimen. It was further noted that this 4.2 percent prestrained specimen exhibited about the same elongation as that previously observed for a longitudinal specimen tensile tested at room temperature. This showed that prestraining transverse Zircaloy-2 specimens at 77° K. had increased their room temperature ductility to about that of longitudinal specimens.

It can be observed from FIGS. 1 and 2 that prestraining within the limits shown did not work-harden the materials tested since the prestrained specimens had approximately the same ultimate strength as the other specimens.

*Example III*

The pure zirconium 0.5-inch plate material referred to in Example I was prepared for prestraining in the following manner. Six tensile specimens were machined from blanks cut from the plate with their long axes parallel to the transverse plate direction. Each blank was milled from the 0.5-inch thickness of the plate to a thickness which depended on the magnitude of the prestrain to be given the material. After cooling to 77° K., the blanks were rolled on their machined surfaces in the transverse plate direction (90° to the original rolling direction) using 0.005-inch increments of reduction. Care was taken to recool the blanks before each pass in order to maintain the rolling temperature at 77° K. After rolling to the specified predetermined thickness, the blanks were cut into pieces approximately 0.30 inch wide and 3.5 inches long, each piece being marked in such a way that the orientation of the rolling direction and the normal to the rolling direction could be identified on the finished tensile specimen. The same machining techniques as in Example 1 were used to produce the ⅛-inch diameter tensile specimens. The respective prestrains, in percent, given to the tensile specimens by 77° K. rolling were: 0.65; 1.04; 3; 6; 9; 12.

The results of these tests are illustrated in FIG. 3 which shows the room temperature tensile properties of transverse pure zirconium specimens as functions of prestrain at 77° K. by cold rolling. Curves G, H, and I are plots of ultimate tensile strength, 0.2% yield strength, and elongation, respectively. Curve I shows the greatest increase in ductility to be produced in the region of small prestrains (less than 2 percent). Moreover, except for a slight drop in the yield strength in the region of maximum elongation, the tensile properties of the specimens, ultimate and yield strengths, showed no marked change below about 9 percent prestrain, while the total ductility (prestrain plus tensile elongation) showed a significant increase.

In order to determine the effect of prestrain at 77° K. on material of another orientation, longitudinal specimens (long axes 90° to the transverse direction) were prepared as noted above from plate material prestrained 1.4 percent by rolling at 77° K. The specimens were tensile tested at room temperature at a strain rate of 0.02 inch per minute. Table I shows the results of this experiment.

TABLE I.—THE EFFECT OF 1.4 PERCENT PRESTRAIN AT 77° K. ON THE ROOM TEMPERATURE TENSILE PROPERTIES OF A LONGITUDINAL ZIRCONIUM SPECIMEN.

| Specimen Prestrain (percent) | Tensile Strength (p.s.i.) | Yield Strength (p.s.i.) | Elongation (percent) |
|---|---|---|---|
| 0.0 | 52,600 | 33,900 | 20.5 |
| 1.4 | 52,600 | 35,100 | 20.4 |

The data of Table I indicated very little change in the properties of the longitudinal specimens as a result of a moderate amount of prestrain, implying that the gain in ductility in a given direction by prestraining is not counteracted by a loss in ductility in other directions.

Applicant's invention can be utilized for improving the ductile properties of zirconium and its alloys when fabricated into various shapes. For example, these materials are useful in nuclear reactions in certain instances in tubular form as well as flat plate form. Tubing and cylindrical objects made of zirconium and Zircaloy-2 usually have a texture in which the basal planes of the grains are parallel to both the tube axis and the radial tube direction. In such a case, the metal can be prestrained in accordance with the invention by the application of an internal pressure to the tubing at about 77° K. This method will prestrain the metal in a manner equivalent to that when transverse tensile specimens are given a 77° K. tensile prestrain and results in increased ductility of the tubing when used as pressure containers at elevated temperatures or as uranium oxide fuel cans, for example.

What is claimed is:
1. A process of improving properties of zirconium and zirconuim alloys wherein the basal planes of the grains are generally parallel to one direction comprising the steps of cooling the metal to a low temperature of about that of liquid nitrogen and prestraining the metal at said low temperature in a direction transverse to said one direction.
2. The process of increasing the ductility of zirconium and zirconium alloy metal tubing wherein the basal planes of the grains are parallel to both the tube axis and the radial tube direction, comprising reducing the temperature of the metal tubing to about 77° K. and applying an internal pressure to said tubing at said low temperature sufficient to prestrain said tubing.
3. The process of claim 1 wherein said prestraining is less than about 9%.
4. The process of claim 1 wherein said prestraining is less than about 2%.
5. The process of claim 1 wherein said low temperature is about 77° K.
6. The process of claim 1 wherein said prestraining is produced by deforming said metal.
7. The process of claim 6 wherein said deforming is produced by tensile straining.
8. The process of claim 6 wherein said deforming is produced by cold rolling.

References Cited

UNITED STATES PATENTS 3,149,008  9/1964  Forsberg _____ 148—125

OTHER REFERENCES

"Fabrication and Mechanical Properties of Ductile Zirconium," ASM, No. 32, 1949, pp. 14–15.

"Effect of Prestraining Temperatures on the Recovery of Cold Worked Aluminum," Metals Transactions, vol. 185, December 1949, pp. 921–926.

"Quarterly Progress Report to the AEC," Rapperport, E. J., Nuclear Metals, Inc., Nov. 14, 1958, pp. 10 and 11.

DAVID L. RECK, *Primary Examiner.*

H. SAITO, *Assistant Examiner.*